United States Patent
Khafagy et al.

(10) Patent No.: US 9,776,635 B2
(45) Date of Patent: Oct. 3, 2017

(54) APPARATUS AND METHOD TO MAXIMIZE VEHICLE FUNCTIONALITY AND FUEL ECONOMY WITH IMPROVED DRIVABILITY DURING ENGINE AUTO STOP-START OPERATIONS

(71) Applicant: FORD GLOBAL TECHNOLOGIES, LLC, Dearborn, MI (US)

(72) Inventors: Hafiz S. Khafagy, Dearborn, MI (US); Kirk Pebley, Novi, MI (US); William J. Bouse, Ann Arbor, MI (US); Zeljko Deljevic, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 101 days.

(21) Appl. No.: 14/616,953

(22) Filed: Feb. 9, 2015

(65) Prior Publication Data

US 2016/0229403 A1    Aug. 11, 2016

(51) Int. Cl.
*B60W 30/18*    (2012.01)
*B60W 10/26*    (2006.01)
(Continued)

(52) U.S. Cl.
CPC ............ *B60W 30/18* (2013.01); *B60W 10/06* (2013.01); *B60W 10/26* (2013.01);
(Continued)

(58) Field of Classification Search
CPC .. F02D 41/065; F02D 2250/06; F02D 41/062; Y02T 10/48; F02N 11/0814;
(Continued)

(56) References Cited

U.S. PATENT DOCUMENTS 6,321,707 B1 * 11/2001 Dunn .................. F02N 11/0866
   123/179.3
6,390,229 B1 * 5/2002 Kaji ..................... B62D 5/0463
   180/443
(Continued)

FOREIGN PATENT DOCUMENTS

JP    5233700    8/2010

*Primary Examiner* — Thomas Moulis
*Assistant Examiner* — John Bailey
(74) *Attorney, Agent, or Firm* — Raymond L. Coppielle; MacMillan, Sobanski & Todd, LLC

(57) ABSTRACT

An auto stop-start equipped vehicle power management system includes a primary power source supplying energy to an electrical starter to crank a vehicle engine and a secondary power source coupled in parallel to the primary power source. The secondary power source supplies energy to electric loads during an engine auto stop-start operation. The electrical loads maintain vehicle subsystem functionality during the engine auto stop-start operation. The energy supplied to the electrical loads is current limited during the engine auto stop-start operation. A controllable switch decouples the secondary power source from the primary power source and starter motor during the engine auto stop-start operation. Operating parameters of the electrical loads are monitored during the engine auto stop-start operation. If a respective operating parameter threshold associated with the electrical loads is exceeded during the engine auto stop-start operation, then the vehicle engine is automatically restarted and the controllable switch is subsequently closed.

20 Claims, 2 Drawing Sheets

(51) Int. Cl.
*B60W 10/06* (2006.01)
*F02N 11/08* (2006.01)
*B60W 30/00* (2006.01)

(52) U.S. Cl.
CPC ....... *B60W 30/18054* (2013.01); *F02N 11/08* (2013.01); *F02N 11/0866* (2013.01); *B60W 30/00* (2013.01); *B60W 2510/18* (2013.01); *B60W 2510/202* (2013.01); *B60W 2510/205* (2013.01); *B60W 2510/305* (2013.01); *B60W 2520/04* (2013.01); *B60W 2710/06* (2013.01); *B60W 2710/248* (2013.01); *F02N 11/0814* (2013.01); *F02N 2200/0808* (2013.01); *F02N 2250/02* (2013.01); *Y02T 10/48* (2013.01)

(58) Field of Classification Search
CPC .... F02N 11/0855; F02N 11/00; Y10T 477/68; B60W 30/18; B60W 10/06; B60W 10/26; B60W 30/18054; B60W 2510/18; B60W 2510/202; B60W 2510/205; B60W 2510/305; B60W 2520/04
USPC ................ 701/112, 113; 123/179.4, 339.22; 477/111
See application file for complete search history.

(56) References Cited

U.S. PATENT DOCUMENTS

| | | | | |
|---|---|---|---|---|
| 7,336,002 B2* | 2/2008 | Kato | ............... | F02N 11/0866 307/10.6 |
| 7,928,735 B2* | 4/2011 | Huang | ............... | B60L 11/1857 320/132 |
| 8,612,113 B2* | 12/2013 | Gibson | ............... | B60W 10/30 180/443 |
| 8,708,090 B2* | 4/2014 | Boot | ............... | B60K 6/48 180/417 |
| 9,181,895 B2* | 11/2015 | Roberts | ............... | F02N 11/0807 |
| 2002/0017260 A1* | 2/2002 | Saito | ............... | F02N 11/0851 123/179.3 |
| 2005/0205345 A1* | 9/2005 | Hayashi | ............... | B62D 15/0285 180/446 |
| 2007/0170778 A1* | 7/2007 | Yamaguchi | ............... | B60K 1/00 307/10.1 |
| 2009/0027056 A1* | 1/2009 | Huang | ............... | B60L 11/1857 324/439 |
| 2009/0241883 A1* | 10/2009 | Nagoshi | ............... | F02N 11/0825 123/179.4 |
| 2009/0243387 A1* | 10/2009 | Conen | ............... | H02J 1/10 307/10.1 |
| 2011/0112740 A1* | 5/2011 | Hashimoto | ............... | F02D 17/02 701/70 |
| 2012/0029852 A1* | 2/2012 | Goff | ............... | G01R 31/3679 702/63 |
| 2012/0116657 A1* | 5/2012 | Kawamoto | ............... | F02N 11/0803 701/113 |
| 2012/0185150 A1* | 7/2012 | Horii | ............... | F02D 29/02 701/102 |
| 2012/0206109 A1* | 8/2012 | Fassnacht | ............... | H02J 7/1423 320/137 |
| 2012/0296506 A1* | 11/2012 | Kotani | ............... | H02J 1/00 701/22 |
| 2013/0041556 A1* | 2/2013 | Sangameswaran | ... | B60W 10/30 701/41 |
| 2013/0229049 A1* | 9/2013 | Larsson | ............... | F02N 11/0814 307/9.1 |
| 2013/0239921 A1* | 9/2013 | Almhagen | ............... | F02N 11/0866 123/179.3 |
| 2013/0297153 A1* | 11/2013 | Chauvelier | ............... | B62D 5/065 701/42 |
| 2013/0313898 A1* | 11/2013 | Proebstle | ............... | H02J 7/1423 307/10.1 |
| 2014/0012488 A1* | 1/2014 | Proebstle | ............... | B60W 30/18018 701/113 |
| 2014/0048031 A1* | 2/2014 | Woelfl | ............... | H02P 7/29 123/179.28 |
| 2014/0136055 A1* | 5/2014 | Sugiyama | ............... | B62D 5/0481 701/42 |
| 2015/0001857 A1* | 1/2015 | Sekiguchi | ............... | B60L 7/10 290/38 C |
| 2015/0019079 A1* | 1/2015 | Romanato | ............... | F02N 11/0822 701/41 |
| 2015/0035356 A1* | 2/2015 | Sakata | ............... | H02J 7/16 307/9.1 |
| 2015/0175103 A1* | 6/2015 | Yamazaki | ............... | B60R 16/02 701/29.1 |
| 2015/0210271 A1* | 7/2015 | Yamazaki | ............... | F02N 11/04 701/22 |
| 2015/0217761 A1* | 8/2015 | Christman | ............... | B60W 20/40 701/22 |
| 2015/0275841 A1* | 10/2015 | Sakata | ............... | B60R 16/033 123/179.28 |
| 2015/0280285 A1* | 10/2015 | Fujita | ............... | H01M 10/26 429/9 |
| 2015/0336523 A1* | 11/2015 | Okaniwa | ............... | B60L 11/18 307/10.6 |
| 2016/0046292 A1* | 2/2016 | Miyashita | ............... | F02D 17/02 701/36 |
| 2016/0089992 A1* | 3/2016 | Le | ............... | H02J 7/0003 320/107 |

* cited by examiner

APPARATUS AND METHOD TO MAXIMIZE VEHICLE FUNCTIONALITY AND FUEL ECONOMY WITH IMPROVED DRIVABILITY DURING ENGINE AUTO STOP-START OPERATIONS

CROSS REFERENCE TO RELATED APPLICATIONS

Not Applicable.

STATEMENT REGARDING FEDERALLY SPONSORED RESEARCH

Not Applicable.

BACKGROUND OF INVENTION

The present invention relates in general to auto stop-start equipped vehicles and power management of high load devices during engine auto stop-start operations.

Vehicles typically utilize a single 12V battery topology as a vehicle's power source; however, such systems have limited charge power capability. With the increasing demand of electric power in modern day vehicles, there is an increasing challenge to utilize all possible power sources that generate energy in the vehicle and maximize the use of these generated energy devices or systems. The maximum amount of energy that can be stored in such devices determines how other devices may be used or when energy can be provided to such devices.

Vehicles capable of performing an engine stop-start operation utilize an internal combustion engine that is turned off when the vehicle is at an idle status. This allows these vehicles to reduce emissions and save on fuel economy since the internal combustion engine is not operating during an auto stop period. Once the auto-stop period has ended, the internal combustion engine is re-started utilizing an auto start operation. Many auto stop-start equipped vehicles primarily use a single battery as their power source. Due to the fact that the single battery has limited power, the energy management system must make sure that a sufficient amount of energy is still present in the battery when the internal combustion engine is re-started during a stop-start operation. Other features that may be pertinent to operate during the period when the internal combustion engine is temporarily turned off are electrical load devices, particularly those that require increased energy draw that may deplete the battery to a point where engine re-start is not feasible. Techniques have been used to try to alleviate this issue, such as preventing the operation of high energy consumption devices/systems (e.g., EPAS, climate control) and/or adding a voltage stability source during an auto stop-start or re-cranking operation; however, having certain features not available for use during the engine-off operation may be noticeable to the driver of the vehicle, which may result in customer dissatisfaction or bringing the vehicle in for service calls.

Even for vehicles utilizing a dual battery system, the system may still draw from both batteries (such as an engine re-start operation by a starter motor) thereby depleting both batteries of the energy. Moreover, if a power source drops below a predetermined voltage level, diagnostic trouble codes (DTCs) may be set, thereby issuing a warning light to the driver, or more so, inhibiting further use of the engine stop-start operation which negates the advantage of what vehicles with auto stop-start functionality is intended for, to reduce emissions and increase fuel economy for the driver.

SUMMARY OF INVENTION

In one aspect of the invention, the system and routine described herein allows an operation of electrical load devices in vehicles during an engine-off sequence for an engine auto stop-start operation. The system includes a primary power source and a secondary power source where the respective power sources are electrically isolated from one another during an auto stop-start operation. During an engine-off sequence, the respective power sources are electrically isolated from one another where electrical loads are supplied energy by the secondary power source while the primary power source is used to actuate the starter and the engine. The electrical load devices of the vehicle maintain their operation by drawing energy only from the secondary power source. This provides the following advantages, the primary power source is not drained of energy from operation of the electrical load devices during the engine-off sequence; the secondary power source is not drained from an in-rush current draw by a starter motor during an engine re-start operation since the starter motor is electrically disconnected from the secondary power source during the engine auto stop-start operation; electrical loads are still operational during the engine-off period; and loads sensitive to low voltage are protected and are assured that a sufficient amount of power is provided at all times during the auto-stop sequence.

In addition, the electrical load devices may be current limited during the engine auto stop-start operation; however, the current-limiting is performed in a manner that is not degradable in a noticeable way to the driver. This provides the advantage of allowing devices to be conditionally operational as expected by a driver of the vehicle during an engine off sequence. This reduces complaints or warranty claims that a device was non-operational during a period when the vehicle was at an idling status.

Moreover, the system described herein provides a further advantage of providing full power to an electrical load device under extreme operating conditions. Capabilities of the power sources and power demands by the electrical load devices are monitored, and should extreme and continuous energy use by a respective electrical load device be demanded, the system will inhibit the engine auto stop-start functionality and start the internal combustion engine so sufficient power may be provided to the respective electrical load device from another power source or power generating device such as an alternator or motor-generator device.

In another aspect of the invention, an auto stop-start equipped vehicle power management system includes a primary power source supplying energy to an electrical starter to crank a vehicle engine and a secondary power source is coupled in parallel to the primary power source. The secondary power source supplies energy to electric loads during an engine auto stop-start operation. The electrical loads maintain vehicle subsystem functionality during the engine auto stop-start operation. A controllable switch decouples the secondary power source from the primary power source and starter motor during the engine auto stop-start operation. Operating parameters of the electrical loads are monitored during the engine auto stop-start operation. If a respective operating parameter threshold associated with the electrical loads is exceeded during the engine auto stop-start operation, the vehicle engine is automatically restarted and the controllable switch is subsequently closed.

In yet another aspect of the invention, a method is provided for managing power in an auto stop-start equipped vehicle. Energy is supplied by a primary power source to a starter motor to crank a vehicle engine. Energy is supplied by a secondary power source to electric loads during an engine auto stop-start operation. The secondary power source is coupled in parallel to the primary power source. The electrical loads maintain vehicle subsystem functionality during the engine auto stop-start operation. The secondary power source is decoupled from the primary power source and an electrical starter by a controllable switch during the engine auto stop-start operation. Operating parameters of the electrical loads are monitored during the engine auto stop-start operation. A determination is made whether a respective operating parameter threshold associated with the electrical loads is exceeded during the auto stop-start operation. The vehicle engine is automatically restarted in response to exceeding the respective operating parameter during the engine auto stop-start operation. The controllable switch is subsequently closed for electrically coupling a primary power source to the secondary power source.

DETAILED DESCRIPTION

Figure 1:
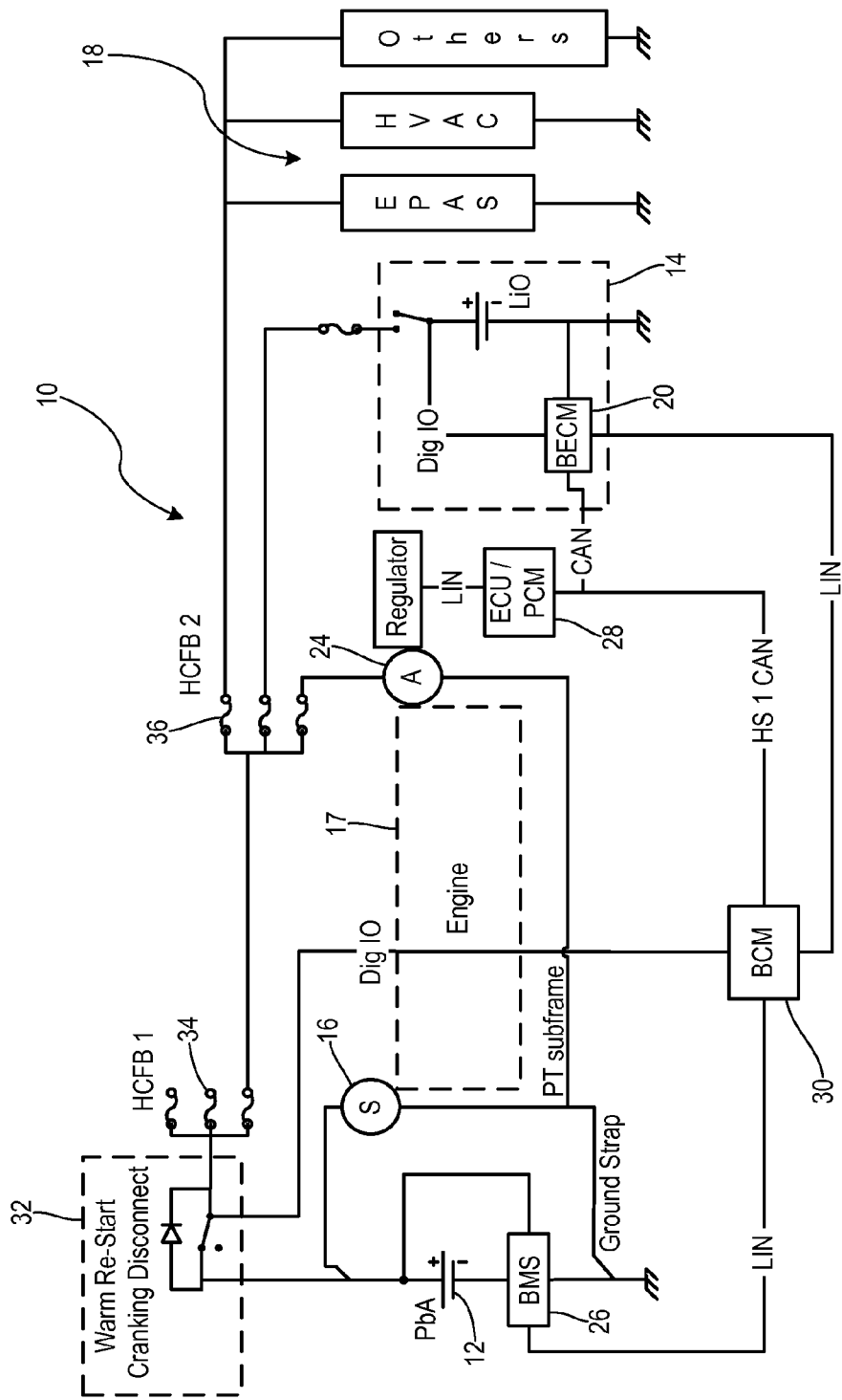
FIG. 1 electrical schematic architecture of a dual power supply system.

There is shown in FIG. 1, an electrical schematic architecture of a dual power supply system 10 for a vehicle equipped with auto stop-start functionality. For the purposes described herein, a vehicle equipped with auto stop-start functionality is defined as a Micro-Hybrid vehicle and/or Mild-Hybrid vehicle having two or more power sources. Micro-Hybrid vehicles include vehicles having more than one 12V power source. Typically Micro-Hybrid vehicles do not include power boost system to electrically power the drivetrain. Mild-Hybrid vehicle are vehicles that include two or more different power sources of different voltage levels (e.g., 12V/48V, 12V/110V). The Mild-Hybrid vehicles include an electric motor that may serve as a power booster and/or start-generator. The vehicles described hereinafter shall be referred to as auto stop-start equipped vehicles and is meant to include both Micro-Hybrid vehicles and Mild-Hybrid vehicles.

The dual power supply system 10 includes a primary power source 12 and a secondary power source 14. The primary power source 12 and the secondary power source 14 are connected in parallel. The primary power source 12 and the secondary power source 14 can be of equal power levels or different power levels depending on whether a Micro-Hybrid or Mild-Hybrid technology is utilized.

The primary power source 12 provides energy to an ignition starting system such as a starter motor 16 for starting an internal combustion engine 17. The primary power source 12 is preferably a lead acid battery, although other types of batteries may be used as the primary power source 12.

The secondary power source 14 is preferably a high efficient power supply that increases the recuperation and power capability of the dual power supply system. An example of a high efficient power supply may include, but is not limited to, a lithium ion battery. During an engine auto stop-start operation, which will be described in detail hereinafter, the secondary power source 14 provides power to a plurality of electrical loads 18 except the starter motor 16. The secondary power source 14 includes a battery energy control module (BECM) 20 for managing and monitoring battery parameters of the secondary power source 14. The secondary power source 14 further includes an internal switch for disconnecting the secondary power source 14 from any devices exterior of the secondary power source 14 should it be necessary. It should be understood that if conventional 12V battery (e.g., lead acid battery) or similar is utilized as the secondary power source that does not require a specialized control module, then monitoring and managing battery parameters of the secondary power source may be performed by the BMS as opposed to utilizing BECM.

Other components utilized by the dual power supply system 10 includes an alternator/regulator 24, battery management system (BMS) module 26, a electronic control module/powertrain control module (ECU/PCM) 28, and a body control module (BCM) 30.

The alternator/regulator 24 is an electrical generator that converts mechanical energy to electrical energy in the form of alternating current. During engine-on conditions while the internal combustion engine 17 is operating, the alternator/regulator 24 generates and regulates electrical energy to the electrical loads 18 and also provides electrical energy to the primary power source 12 and the secondary power source 14 for recharging cells of both power sources.

The BECM 20 and the BMS 26 function substantially similar for their respective power sources. Each module monitors and reports battery conditions that include, but are not limited to, a state of charge (SOC), a battery storage capacity, a battery temperature, a battery state of health (SOH), and a voltage level.

The SOC is defined as the available capacity expressed as a percentage of some reference. The SOC cannot be measured directly, but can be estimated from direct measurement variables. The SOC may be a rated capacity; however, typically, the SOC is its current capacity (i.e. at the latest charge-discharge cycle). Examples of techniques for indirectly determining the SOC include coulomb-counting (e.g. current integration) chemical-based methods, voltage-based methods, and kalman filtering.

The battery storage capacity is the capacity of a battery to store a charge and is measured in ampere-hours (Ah), which defines the current in amps (A) that can be supplied for a given period of time until the battery discharges to a given voltage. The Ah value depends on the current drawn and the temperature of the battery in addition to other parameters.

The battery temperature is the temperature of the battery. Based on the battery temperature, the engine auto stop-start operation may or may not be allowed to operate. If the battery temperature is below certain value, a system start will be inhibited to operate until the battery temperature is increased to be within the allowable window. If the battery temperature is above certain value, the system start will be inhibited to operate until the battery temperature is decreased to be within the allowable window.

The battery SOH is a representative measurement that reflects the general condition of a battery and its ability to deliver the specified performance compared with a fresh battery. It takes into account such factors as charge acceptance, internal resistance, voltage, and self-discharge. The battery SOH is typically represented in percentage terms.

The voltage level is the measured battery voltage. If the battery voltage is less than certain threshold, the stop-start feature will be inhibited, which means that a request for re-start is requested (Pull-Up).

The ECU/PCM 28 monitors, controls, and regulates engine operating conditions, such as an alternator.

The BCM 30 diagnoses a power state of the electrical loads, and controls and regulates the electrical loads within the vehicle. The BCM 30 communicates with the BECM 20, BMS 26, and ECU/PCM 28 through one or more communication buses (e.g., CAN, LIN) for obtaining data relative to the current state of the loads of each of the respective power sources, and enables charging and discharging of a power source or controlling energy regulation to electrical loads.

The dual power supply system 10 further includes a warm re-start cranking disconnect 32 that includes a controllable switch that is used to selectively disconnect and isolate the primary power source 12 and starter motor 16 from the secondary power source 14, alternator/regulator 24, and electrical loads 18 during certain operations. The warm re-start cranking disconnect 32 may include, but is not limited to, mosfets and relays, and may be controlled by a digital signal (dig IO).

The dual power supply system 10 may further include a first high current fuse box 34 and a second high current fuse box 36. The first high current fuse box 34 supports loads provided to and from the primary power source 12. The second high current fuse box 36 supports loads provided to and from the secondary power source 14.

An auto stop-start equipped vehicle may utilize both a traditional internal combustion engine system and a power-boost system. The power-boost allows the vehicle to achieve enhanced fuel economy in contrast to a pure convention combustion engine. Enhanced fuel economy is attained by the use of regenerative braking, which converts the vehicle's kinetic energy into electric energy to charge a battery. Electrical generators (known as motor-generators) are coupled to the drivetrain which generates electricity as the vehicle is driven to either recharge battery cells or to power the electric drive motors and other electrical devices. Moreover, the auto stop-start equipped vehicle utilizes engine auto stop-start functionality as referred to earlier. Engine auto stop-start functionality is defined herein as autonomously turning off the internal combustion engine when the vehicle is in an idle/stationary condition and subsequently restarts the internal combustion engine when acceleration of a vehicle powertrain system is required. Engine auto stop-start functionality reduces idle emissions and saves on fuel economy by autonomously turning off the internal combustion engine when the vehicle is idling at a stationary position (e.g. stop sign, red light) or rolling stop, and restarts the internal combustion engine when acceleration of a vehicle powertrain system is required as demanded by the driver via a gas pedal.

When the vehicle is at auto stop status, electrical loads may still demand power from the power sources to maintain its operation. While certain electrical loads may require minimal power draw, high-current consumption electrical loads may require elevated amounts of power in comparison to low-current consumption electrical loads. With the increasing number of electronic devices on the vehicle, the conventional primary power source (i.e., 12V lead acid battery) has limited charge power capability due to a dynamic charge acceptance and constraints of the lead acid battery. If the primary power source were utilized to provide power to all electrical loads during the engine auto stop-start operation, the primary power source may deplete itself such that an insufficient amount of energy is maintained in the primary power source 12 to re-crank the internal combustion engine 17 during an engine re-start for the engine auto stop-start operation.

Therefore, as illustrated in the FIG. 1, only the secondary power source 14 is configured to supply energy to all electrical loads during the engine auto stop-start operation. This is performed utilizing the controllable switch within the warm re-start cranking disconnect 32. The BCM 30 monitors the state of the auto stop-start equipped vehicle through communications with the various modules described herein, specifically, the ECU/PCM 28. The ECU/PCM 28 detects that the vehicle is at an idle condition or similar, turns off the internal combustion engine, and concurrently transmits a status signal to the BCM 30. The BCM 30, in response to the received status signal, transmits a control signal to the warm re-start cranking disconnect 32 to open the controllable switch. The opening of the controllable switch decouples and isolates the primary power source 12 and starter motor 16 from the secondary power source 14, electrical loads 18, and alternator/regulator 24. While the internal combustion engine 17 is turned off, all electrical loads, except for the starter motor 16, are preferably supplied by the secondary power source 14. This prevents voltage drain of the primary power source 12 that could decrease the voltage below a sufficient voltage required to actuate the starter motor 16 and successfully crank the internal combustion during the engine auto stop-start operation. As a result, the primary power source 12 can dip to substantially 7.0V, which is sufficient for engine restart during the engine auto stop-start operation. Since no other devices that have excessive power draw are coupled to the primary power source 12 during the engine auto stop-start operation, at least the 7.0V minimum voltage level can be maintained. Moreover, during the engine auto stop-start operation, since the starter motor 16 is coupled only to the primary power source 12 and isolated from the secondary power source 14, this ensures that battery drain will not occur with respect to the secondary power source 14 as a result of the in-rush current drawn by the starter motor 16 during a re-start operation.

Consequently, precautions must be taken to assure that the secondary power source is not depleted during an engine auto stop-start sequence by electrical loads that are active during the engine auto stop-start operation. In regards to a condition where battery drain occurs and the voltage of the secondary power source falls below a predetermined voltage threshold, a DTC may be set which involves preventing operation of electrical loads during the engine auto stop-start sequence. This in turn, would result in electrical loads not being active during the engine auto stop-start operation or inhibiting engine auto stop-start operations.

An example of one such electrical load is an electronic power assist steering (hereinafter including the claims referred to as EPAS) device. It should be understood that the EPAS is only one example of an electrical load utilized by the system/routine described herein, and that other electrical load systems that may be utilized by the routine describe herein include, but are not limited to, HVAC, window lift systems, tailgate lift systems, electronic braking systems. EPAS uses an electric motor to assist the driver in performing a steering maneuver of a vehicle. One or more sensors detect a position and torque in a steering column. An assistive torque is determined and produced in response to the input position and torque that is applied to the steering system. The amount of torque applied to the steering and the resulting current draw varies depending on the driving conditions. For example, more steering assistance is required when a steering maneuver is executed while traveling at slow speeds, whereas less assistance is provided when the vehicle travels at faster speeds. As typical with most electrical load devices that generate torque, the more torque that is required, the more energy that is consumed by an electrical loads device.

Other drivability aspects that control EPAS current draw is the steering rate. It is understood that the current draw, while steering, is substantially increased if the rate of rotating/moving the steering wheel increased. The system described herein supports current draws that allow steering rates in the range of 80-270 deg/sec or as best calibrated value. This maximizes the availability of the auto stop-start operations and maximizes fuel economy. However, the system will also inhibit auto stop-start operations if the driver's input to the steering wheel exceeds a threshold rate of steering to accommodate the driver's excessive steering demands.

Furthermore, the strategy described herein allows the system to provide the driver with a threshold amount of consistent maximum calibrated threshold torque for a certain calibrated time/timer before issuing the auto-start request.

An EPAS subsystem requires elevated current draw and power consumption to move the steering column particularly when the vehicle is not moving, which inturn moves the vehicle wheels in comparison to other electrical loads of the vehicle. The EPAS subsystem can draw up to 100 A or more particularly during severe steering maneuvers by the driver while at idle. This is too much power consumption demanded by the driver's input actions while the engine is in an auto-stop sequence. The EPAS subsystem requires the voltage across an EPAS module to be higher than a predetermined threshold value represented by <EPAS_LOW_VOLTAGE_VALUE_TO_OPERATE> (e.g., 9.5V) during its operation in order to function without issues, as it will otherwise set a code if the voltage across drops less than 9.5V. The 9.5V across the EPAS mandates that a battery voltage is above 10.5V at all times. Setting a code will inhibit the internal combustion engine from being auto stopped. As a result, the EPAS demand for power jeopardizes engine auto stop-start availability and the associated advantages that are produced by engine stop-start operations.

Systems that utilize a dual power supply system without safeguards where a demand for increased voltage minimizes the availability of engine auto stop-start operation as the current for the engine auto stop-start operation allows the voltage to dip to a minimum operating voltage is represented by <MIN_VOLTAGE_ACROSS_LOAD> (e.g., 6.0V) across an EPAS module during re-crank events. The EPAS system demand for increased current will increase the current drawn from the battery over an allowed level/threshold value for engine auto stop-start operation. The increased demand can also result in the engine auto stop-start operation being inhibited from operating or operating with less performance than expected. This may be the case when the vehicle is stopped at a red light and the engine is turned off, and the driver attempts to perform a steering maneuver when the vehicle is not moving. As more torque is required to turn the vehicle wheels when the vehicle is stopped, the current drawn or power consumed may exceed a respective threshold. As a result, a system safeguard of inhibiting EPAS or operating EPAS at a severely reduced level may generate customer dissatisfaction or generate service/warranty complaints from the customer.

To prevent this issue from occurring, the EPAS system will allow the driver to perform steering operations, but under monitored conditions. The EPAS module controls and limits the amount of current provided to the EPAS subsystem. The current-limited EPAS subsystem functionality is performed in a manner that is not degradable in a noticeable way to the driver. As described, current is limited by the EPAS module to a nominal value that will allow operation of the EPAS subsystem while not being noticeable to the driver. However, if severe operating demands are detected by monitoring operating parameters of the EPAS subsystem, then engine auto stop-start operations are inhibited. Such operating parameters that are monitored may include exceeding a maximum current draw, exceeding a maximum steering rate, exceeding a maximum steering angle, and exceeding a maximum steering applied torque.

The maximum current draw is set at a predetermined current threshold limit. For example, the current draw may be capped at anywhere in a range of 30-100 A for up to 1 second. The predetermined current threshold limit and duration of time is calibratable. This respective maximum current draw correlates to an associated steering turn rate. For example, a maximum current draw at 45 A for 1 sec correlates to a steering turning rate of 180 deg/sec. If a steering turning rate threshold is set to 180 deg/sec and a higher steering rate is detected, then a Pull-Up request is initiated. A Pull-Up request is defined as a request to inhibit engine auto stop-start operations and to start the internal combustion engine. Under this condition, the secondary power source cannot meet the energy demands of the driver's input to the steering system as determined by the current draw or a steering column. Therefore, to support the excessive steering demands, the internal combustion engine is started so that the EPAS subsystem can draw power from another device, such as the alternator, and not deplete the secondary power source since the secondary power source is capped for the amount of power that it can provide during the engine auto stop-start operation.

In regards to exceeding the maximum steering angle threshold, if a steering wheel sensor detects that a steering input as demanded by the driver is greater than a predetermined steering wheel angle threshold, then the EPAS steering module requests a Pull-up request to start the internal combustion engine. A predetermined steering wheel threshold is preferably set to a value in the range +/−300 degrees. As described earlier, starting the internal combustion engine will allow other power sources such as the vehicle alternator, to supply the additional power as demanded by the EPAS subsystem. It should be understood that the predetermined steering wheel angle threshold is calibratable and can be adjusted for a respective steering system or type of vehicle.

In regards to exceeding the maximum applied steering torque threshold, if a steering torque sensor detects that a steering torque as demanded by the driver is greater than a predetermined steering torque threshold, then the EPAS steering module requests a Pull-up request to start the internal combustion engine so that other power sources such as the vehicle alternator to supply the additional power as demanded by the EPAS subsystem. It should be understood that the predetermined steering torque threshold is calibratable and can be adjusted for a respective steering system or a type of vehicle. A predetermined steering torque threshold is preferably set to a value in the range 5 Nm for at 0.5-2.5 sec.

It should be understood that the above parameters setting forth the criteria for inhibiting engine auto stop-start operations is reconfigurable and can be recalibrated using software. Moreover, the techniques described herein is not only utilized when a vehicle is at stop and idling, but may be used when the vehicle is performing a rolling stop.

Figure 2:
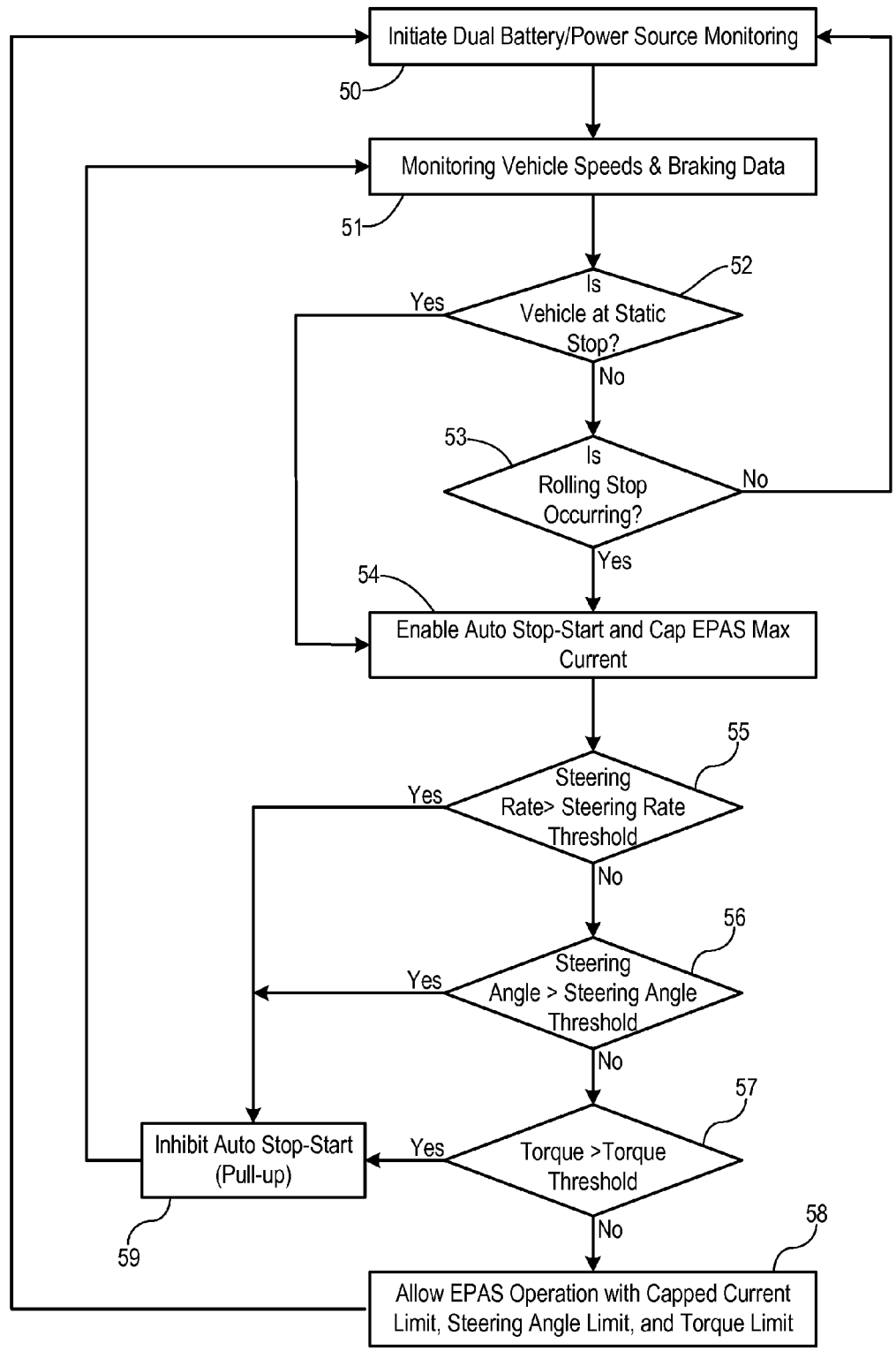
FIG. 2 illustrates a flowchart of a block diagram for the power management during an engine auto stop-start operation.

FIG. 2 illustrates a flowchart for a method for managing power supplied to electric loads during an engine auto stop-start operation for an auto stop-start equipped vehicle. The example described herein utilizes the EPAS system, however, it should be understood that other types of electrical loads which utilizes power from the secondary power source during an engine auto stop-start operation may use the process described herein.

In step 50, a dual battery power source monitoring technique is initiated. Voltages, currents draws, and power demands are monitored for both power sources by respective battery management systems. Various factors including, but not limited to, SOC, SOH, battery storage capacity, battery temperature, and battery voltage may be utilized to assess the operating conditions of the battery.

In step 51, vehicle speeds and braking data are obtained for determining whether the car is at idle, decelerating, or in transit.

In step 52, a determination is made whether the vehicle is at a static stop. For example, if the speed of the vehicle is reduced to less than 0.5 mph while braking is applied, then a determination is made that the vehicle is at a static stop and the routine proceeds to step 54. If the determination is made that the vehicle is not a static stop, then the routine proceeds to step 53.

In step 53, a determination is made whether the vehicle is performing a rolling stop. For example, if the vehicle speed is less than 20 mph, continuous braking is being applied, and the vehicle is decelerating, then a determination is made that the vehicle is performing a rolling stop and the routine proceeds to step 54. If a determination is made that the vehicle is not performing a rolling stop, then the routine returns to step 50 to continue monitoring the power sources, vehicle speeds, and braking data. It should be understood that the assessment of steps 52 and 53 may also be performed in opposite order or concurrently.

In step 54, in response to the vehicle being at idle, either in a static stop status condition or in a rolling stop status condition, the engine auto stop-start operation is enabled. While operating when the engine auto stop-start function is enabled, the EPAS module limits the current that may be drawn from the secondary power source by the EPAS system. The EPAS module places a cap on the maximum current draw in the range of 30-100 A for up to 1 second. It should be understood that the parameters set forth herein on the current draw and the maximum current draw are calibratable, which may be based on the EPAS system designed within the vehicle, the size of the secondary power source, and the size of the wheels contacting the ground surface which contributes to the amount of torque required to turn the vehicle wheels when the vehicle is not moving.

In step 55, a determination is made whether a steering turning rate is greater than a predetermined steering rate threshold (80-270 deg/sec). The steering turning rate may be determined by a sensor on the steering column, by a current sensor, or other devices or data. The steering turning rate may be correlated with the current drawn from the secondary power source over a respective time period while a steering maneuver is performed. If the determination is made that the steering turning rate is greater than the predetermined steering turning rate threshold, then the routine proceeds to step 59; otherwise, the routine proceeds to step 56.

In step 56, a determination is made whether a steering angle of turn is greater than a predetermined steering angle threshold (+/−300 deg). If the determination is made that the steering angle is greater than the predetermined steering angle threshold, then the routine proceeds to step 59; otherwise, the routine proceeds to step 57.

In step 57, a determination is made whether a steering torque applied to the steering wheel is greater than a predetermined steering torque threshold (5 Nm). If the determination is made that the steering torque is greater than the predetermined steering torque threshold, then the routine proceeds to step 59; otherwise, the routine proceeds to step 58.

In step 58, a determination is made that all operating parameters of the EPAS system are within the operating limits imposed for the EPAS system. As a result, engine auto stop-start operation is maintained where the engine is turned off and energy is provided to the EPAS system. The routine proceeds to step 50 to continuously monitor the power source parameters, vehicle speeds, and braking data for determining whether the status has changed with respect to any of the monitored thresholds until the engine is restarted.

In step 59, in response to one of the respective operating parameters being greater than a respective predetermined threshold, the engine auto stop-start operation is inhibited. In response to inhibiting the engine auto stop-start operation, a Pull-Up is performed. The Pull-Up is defined as re-starting the internal combustion engine so that another power source or energy generating device (e.g., alternator) may be used to supply the EPAS system with a sufficient amount of energy to perform task as requested by the driver's input to the steering system. After the Pull-up is performed, a return is made to step 51.

It should be understood that each of the respective thresholds as described within this routine are calibratable, such that each threshold may be modified accordingly based on steering system design or other vehicle parameter design.

While certain embodiments of the present invention have been described in detail, those familiar with the art to which this invention relates will recognize various alternative designs and embodiments for practicing the invention as defined by the following claims.

What is claimed is:

1. An auto stop-start equipped vehicle power management system comprising:
   a primary power source supplying energy to an electrical starter to crank a vehicle engine;
   a secondary power source coupled in parallel to the primary power source, the secondary power source supplying energy to electric loads during an engine auto stop-start operation, the electrical loads maintaining vehicle subsystem functionality during the engine auto stop-start operation;
   a controllable switch decoupling the secondary power source from the primary power source and starter motor during the engine auto stop-start operation;
   wherein operating parameters of the electrical loads are monitored during the engine auto stop-start operation, wherein if a respective operating parameter threshold associated with the electrical loads is exceeded during the engine auto stop-start operation, the vehicle engine is automatically restarted and the controllable switch is subsequently closed.

2. The system of claim 1 wherein the energy supplied to the electrical loads is current limited during the engine auto stop-start operation.

3. The system of claim 1 wherein the respective operating parameter threshold is calibratable.

4. The system of claim 3 wherein the electrical loads include an EPAS system.

5. The system of claim 4 wherein the operating parameters include a steering rate applied to a steering system, wherein the operating parameter threshold includes a value in a range of 80-270 deg/sec.

6. The system of claim 4 wherein the operating parameters include a steering wheel angle applied to a steering system, wherein the operating parameter threshold includes a value in a range of +/−300 degrees.

7. The system of claim 4 wherein the operating parameters include a steering torque applied to a steering system, wherein the operating parameter threshold includes 5 Nm for at least 0.5-2.5 seconds.

8. The system of claim 4 wherein a body control module sets a maximum current limit, wherein the maximum current limit includes value in a range of 30-100 Amps.

9. The system of claim 4 wherein the engine auto stop-start operation is performed when the vehicle is stationary.

10. The system of claim 4 wherein the engine auto stop-start operation is performed when the vehicle executes a rolling stop operation.

11. The system of claim 3 wherein the electrical loads include a heating ventilation and air conditioning system.

12. The system of claim 3 wherein the electrical loads include an electrical braking system.

13. A method of managing power in an auto stop-start equipped vehicle comprising the steps of:
supplying energy, by a primary power source, to a starter motor to crank a vehicle engine;
supplying energy, by a secondary power source, to electric loads during an engine auto stop-start operation, the secondary power source coupled in parallel to the primary power source, the electrical loads maintaining vehicle subsystem functionality during the engine auto stop-start operation;
decoupling the secondary power source from the primary power source and an electrical starter by a controllable switch during the engine auto stop-start operation;
monitoring operating parameters of the electrical loads during the engine auto stop-start operation;
determining whether a respective operating parameter threshold associated with the electrical loads is exceeded during the auto stop-start operation;
automatically restarting the vehicle engine in response to exceeding the respective operating parameter during the engine auto stop-start operation; and
subsequently closing the controllable switch for electrically coupling a primary power source to the secondary power source.

14. The method of claim 13 further comprising the step of current limiting the energy supplied to the electrical loads during the engine auto stop-start operation.

15. The method of claim 14 wherein the electrical loads include an EPAS system.

16. The method of claim 15 wherein a maximum current limit is selected from a range of 30-100 Amps.

17. The method of claim 16 wherein the operating parameters include a steering rate applied to a steering system, wherein the operating parameter threshold is selected from a range of 80-270 deg/sec.

18. The method of claim 15 wherein the operating parameters include a steering wheel angle applied to a steering system, wherein the operating parameter threshold is selected from a range of +/−300 degrees.

19. The method of claim 15 wherein the operating parameters include a steering torque applied to a steering system, wherein the operating parameter threshold includes 5 Nm for at least 0.5-2.5 seconds.

20. A system comprising:
a primary power source energizing a starter motor;
a secondary power source energizing electrical loads for maintaining subsystem functionality during an engine auto stop-start operation;
a switch decoupling the primary and secondary power source during the engine auto stop-start operation;
wherein operating parameters associated with electrical loads are monitored, wherein the engine is restarted and the switch is subsequently closed in response to exceeding an operating parameter threshold during the engine auto stop-start operation.

* * * * *